Oct. 31, 1939.   J. A. GIBBONS   2,177,709
DEVICE FOR IMPARTING MOTION TO TOY AIRPLANES
Filed Jan. 12, 1938   2 Sheets-Sheet 1

INVENTOR
JAMES A. GIBBONS
BY W. A. Beatty
ATTORNEY

Oct. 31, 1939.                J. A. GIBBONS                 2,177,709
                 DEVICE FOR IMPARTING MOTION TO TOY AIRPLANES
                    Filed Jan. 12, 1938          2 Sheets-Sheet 2

INVENTOR
JAMES A. GIBBONS
BY
          W. E. Beatty
          ATTORNEY

Patented Oct. 31, 1939

2,177,709

UNITED STATES PATENT OFFICE 2,177,709

DEVICE FOR IMPARTING MOTION TO TOY AIRPLANES

James A. Gibbons, North Hollywood, Calif., assignor to Warner Bros. Pictures, Inc., New York, N. Y., a corporation of Delaware Application January 12, 1938, Serial No. 184,609

15 Claims. (Cl. 46—77)

This invention relates to photography and particularly to apparatus for maneuvering a miniature or model airplane, or the like, to simulate actual flight or movement of the airplane, or the like, whereby a motion picture may be produced of the miniature as a foreground object, preferably while moving in front of a suitable background.

In United States Patent No. 2,045,084 to Fred W. Jackman there is disclosed an arrangement for maneuvering a miniature airplane while producing a composite picture of the miniature and a background. In that case, however, a photograph representing actual flight conditions is produced by making a dolly shot of a miniature which is maneuvered about a fixed vertical axis, the maneuvering of the miniature being coordinated with the movement of the camera and with the changing background scene. As disclosed in the patent, the background may be either a dye toned transparency in the camera for a color separation shot, or it may be a motion picture projected on a translucent screen.

Although the above described arrangement is particularly adapted for certain shots, it requires an exact coordination between the movements of the background component and the movements of the foreground component to represent the airplane as being in flight. Furthermore as the miniature airplane, or the like, does not travel in the same manner as the full scale airplane would, it precludes the use of model or miniature backgrounds (for a motion picture background scene projected on a translucent screen) being photographed with the airplane moving in a natural manner in front thereof.

The object of the present invention is to obviate the above mentioned difficulties, while making it possible to photograph the foreground and an actual background by simple photography, although composite photography may also be used.

In accordance with the present invention the object comprising the foreground component of a scene such as a miniature airplane, is suspended on a plurality of cables supported at either side thereof. Suitable manipulating devices are provided at either supported ends of the cables to move the object in a path similar to the path the object would follow under actual travelling conditions, with means for maneuvering the object, viz., banking and tilting an airplane, while it is moved along its path. The airplane, or the like, may be thus moved and maneuvered in front of a miniature set for simple photography, or it may be thus moved and maneuvered in front of a translucent screen on which a background motion picture is projected, for composite photography.

For further details of the invention, reference may be had to the accompanying drawings wherein:

Fig. 9 is a fragmentary view illustrating one of the ferrules for removably suspending the airplane from the suspension cables.

While the invention will be described in connection with and is particularly adapted to the maneuvering of a miniature airplane to simulate the actual movement of a full sized airplane, it will be understood that the invention can also be used to maneuver any object along a predetermined path. For example, a miniature submarine may be moved, to simulate actual travelling conditions of a full-sized submarine.

Figure 1:
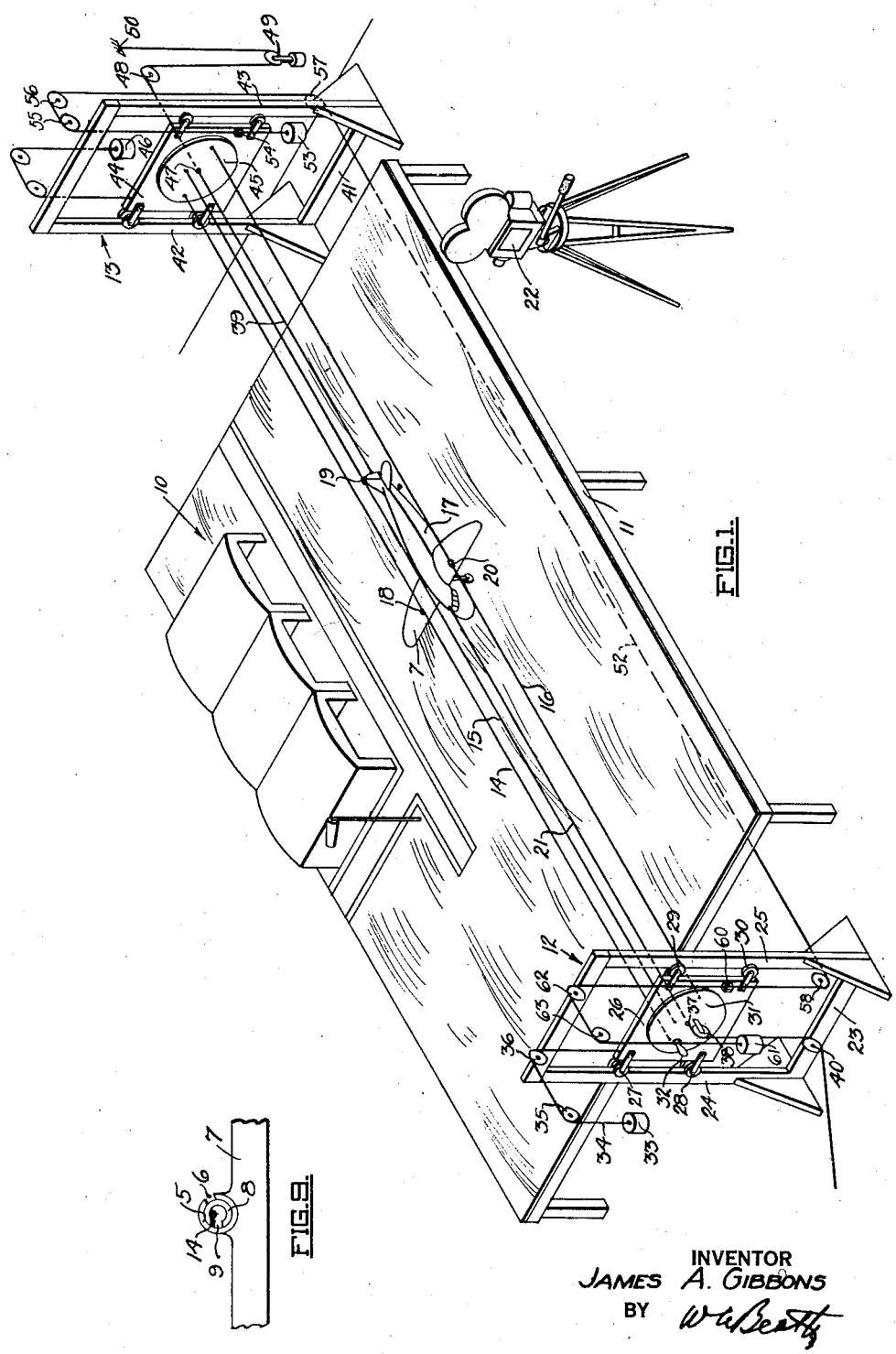
Fig. 1 is a perspective view of an apparatus for maneuvering a model airplane according to the present invention.

Referring to Fig. 1 the background component of the scene comprises in this case, a physical set, forming a miniature airport 10 supported on a suitable platform 11. A pair of elevators generally indicated at 12 and 13 are provided on either side of the set 10 to support the ends of three suspension cables 14, 15 and 16. A miniature airplane 17, the size of which is directly proportional to the size of the set 10, is slidably suspended from a track comprising the cables 14, 15 and 16 by guides or ferrules 18, 19 and 20.

A ferrule for suspending one of the wings is shown in Fig. 9 and all of the ferrules 18, 19 and 20 are similarly constructed. The ferrule in Fig. 9 comprises an outer cylindrical sleeve 5 having a longitudinal slot 6 therein. Sleeve 5 is suitably secured to the wing portion 7 of the miniature 17 and is preferably disguised as a light or other projection thereon. An inner cylindrical sleeve 8 closely fitted within the sleeve 5 also has a longitudinal slot 9 formed therein. When the ferrule is to be attached to or detached from its corresponding cable the inner sleeve 8 is rotated with a screw driver until the slot 9 therein is aligned with the slot 6 in sleeve 5 permitting the suspension cable to be slipped transversely through these two slots.

The above mentioned type of ferrule is disclosed and claimed in the co-pending application of James A. Gibbons entitled Cable trolley, Serial No. 185,004, filed January 14, 1938. A draw cable 21 attached to the forward end of the airplane 17 is provided for drawing the plane along the wires 14, 15 and 16 past a motion picture camera 22 directed toward the set 10.

The elevator 12 comprises a base 23 suitably supported on the floor. A pair of spaced upright guide members 24 and 25 extend upwardly from the base 23 to form an elevator frame. A carriage 26 is movable vertically along the track or guide members 24 and 25 and is supported therefrom by guide rollers 27 to 30 inclusive. A turntable 31 is mounted on the carriage 26 for rotation about a horizontal axis and has secured to the face thereof one end of each of the cables 14, 15 and 16. The turntable 31 is provided with a handle 32 by means of which the turntable may be turned. The weight of carriage 26 is counterbalanced by a weight 33 connected to the carriage 26 by a cable 34 passing around a pair of pulleys 35 and 36 rotatably supported in fixed relation to the guide members 24 and 25.

The draw cable 21 passes through an aperture 37 provided directly in the center of the turntable 31, over a pulley 38 suitably supported by the turntable 31, under a second pulley 40 supported in fixed relation to the elevator 12 and is adapted to be drawn by hand or by any suitable motive means such as a motor and winding drum.

The elevator 13 is similar to that of 12 and comprises a base 41, uprights 42 and 43, a carriage 44 movable vertically along the guide members 42 and 43, a turntable 45 rotatably mounted on the carriage 44 and a counterweight 46 for counterbalancing the weight of the carriage 44 and turntable 45. In order to permit the miniature airplane 17 to be drawn smoothly along the cables 14, 15 and 16, and also to permit the airplane 17 to be returned to its original position after being drawn across the set 10, a cable 39 is secured to the tail of the plane 17 and passes through a centrally located aperture 47 in the turntable 45. Cable 39 passes over a pulley 48 preferably supported in a manner not shown by the turntable 45, thence around a weighted pulley 49 and has the end thereof secured at 50 to a suitable stationary support.

During the photographing operation the airplane 17 is drawn by the cable 21 from a position adjacent the elevator 13 across the front of set 10, past the field of the motion picture camera 22. During the travel of the plane 17 across the set 10 either or both of the carriages 26 and 44 may be raised or lowered to impart a rising or falling movement to the plane 17, while simultaneously oscillating either of the turntables 31 and 45 to impart a tilting or rocking movement to the plane 17, thus simulating actual flight conditions.

It will, of course, be understood that the cables 14, 15, 16 and 21 are very small and are painted black or other non-actinic colors so as to be non-actinic and invisible. Furthermore, certain of these cables may be connected to a source of electric current supply so as to form a circuit connection to certain electrical devices associated with the plane 17, such as lights, a motor for driving a propeller, etc.

In the event that it is desired to retain the airplane 17 in a horizontal position throughout its path of movement across the set 10, a synchronizing cable 52, suitably connected between the carriages 26 and 44, may be employed to move these carriages in a parallel manner. Cable 52 is connected at one end thereof to a weight 53 and is removably clamped to the carriage 44 through a clamp 54. Cable 52 then passes over a pair of pulleys 55 and 56, under a third pulley 57, thence across and below the set 10, under a fourth pulley 58 adjacent the elevator 12. Cable 52 is removably clamped to the carriage 26 by clamp 60. The end of cable 52 adjacent the carriage 26 is weighted at 61 after passing around a pair of pulleys 62 and 63. It will thus be seen that as either of the carriages 26 or 44 is raised or lowered vertically, a corresponding movement will be imparted to the other of these carriages, thus maintaining the airplane 17 in a horizontal position at all times while being raised or lowered by the carriages 26 and 44 and at the same time it may be banked or tilted by either or both of the turntables 31 and 45.

Figure 2:
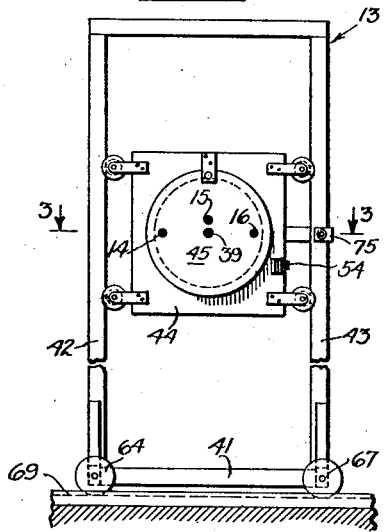
Fig. 2 is an elevational view of one of the elevators employed in Fig. 1.
Figure 3:
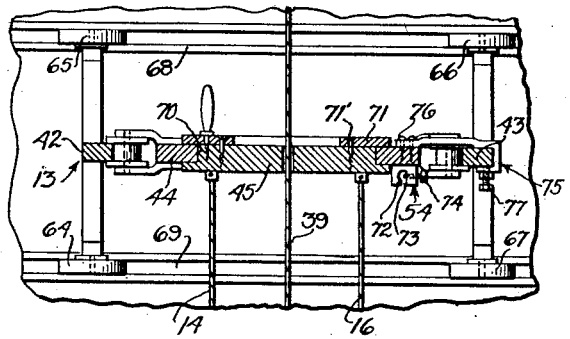
Fig. 3 is a sectional plan view of one of the elevators along the lines 3—3 of Fig. 2.

Referring to Figs. 2 and 3, illustrating one of the elevators 13, either of these elevators may be moved laterally so as to impart a lateral movement to the airplane 17 by the provision of a set of wheels 64, 65, 66 and 67 on the base of the respective elevator. These wheels 64 to 67 inclusive are guided along tracks 68 and 69 to permit a lateral shifting movement of the elevator.

The turntable 45 is shown as comprising a flanged circular disk rotatably fitted within a circular aperture 70 formed in the carriage 44. An annular flange 71 suitably secured by screws 71' to the disk forming the main portion of the turntable 45 on the side opposite the flanged portion thereof is provided to retain the turntable 45 on the carriage 44. The clamp 54 for removably securing the synchronizing cable 52 to the carriage 44 comprises a block 72 suitably secured to the face of the carriage 44. A slot 73 formed in the block 72 permits the insertion of the cable 52 therein, which cable is adapted to be secured within the slot 73 by a clamp screw 74. A clamp 75 comprising a U-shaped member secured at 76 to the carriage 44 and extending around the upright guide member 43 is provided to clamp the carriage 44 in any desired vertical position. A clamp screw 77, threaded in one of the legs of clamp 75, is provided to secure the clamp 75 to the guide member 43.

Figures 4, 5, 6:
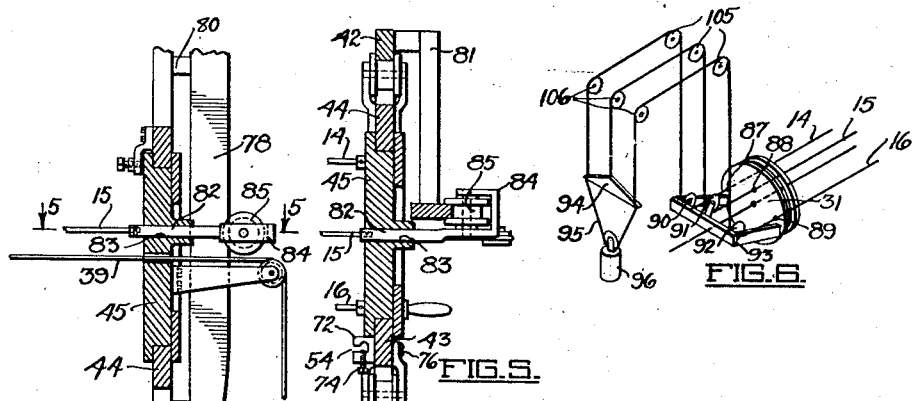
Fig. 4 is a sectional elevational view through a modified form of elevator mechanism.
Fig. 5 is a sectional plan view taken along the lines 5—5 of Fig. 4.
Fig. 6 is a perspective schematic view of a counterbalancing system for maintaining the suspension cables under a constant tension.

Figs. 4 and 5 illustrate a modified form of elevator mechanism to be employed for automatically changing the effective length of cable 15 to raise or lower the tail of the airplane 17. A vertically extending stationary cam 78 is supported from upright guide member 42 by spaced brackets 80 and 81. The suspension cable 15 supporting the tail of the airplane 17, instead of being secured to the face of the turntable 45, is secured to a plunger 82 slidably mounted within an aperture 83 located directly above the center of the turntable 45. Plunger 82 is formed into a U-shaped stirrup 84 in which is rotatably mounted a cam follower wheel 85 engaging the cam surface of cam 78. As the carriage 44 is moved vertically so as to raise or lower the airplane 17, the wheel 85 will follow the surface of the cam 78 and thus cause the cable 15 to tighten or sag and consequently cause the tail of the airplane to raise or lower. This tilt apparatus of Figs. 4 and 5 is particularly adapted for maneuvering the airplane 17 to simulate landing or take-off thereof. The cam 78 is so shaped and positioned that while the plane 17 is in contact with the floor of the set 10, the tail suspension cable 15 will allow the airplane to assume a three point contact with the floor. As the tail is tilted in a slightly different manner, for take-off and for landing, separate cams of correspondingly different shapes may be used for take-off and landing, if desired.

In the event that the effective distance between the two turntables 31 and 45 is materially changed during vertical movement of either of the carriages 26 and 44, either because the elevators 12 and 13 are spaced relatively close together or because the carriages 26 and 44 are moved vertically a relatively large amount with respect to each other, a counterbalancing system illustrated in Fig. 6 may be employed to produce a constant tension on the cables 14, 15 and 16 regardless of the positions of the carriages 26 and 44. Herein the cables 14, 15 and 16 pass through apertures 87, 88 and 89 in the turntable 31 and under pulleys 90, 91 and 92 respectively carried on an extension 93 suitably supported from the turntable 31. The ends of the cables 14, 15 and 16 after passing around supporting pulleys 105 and 106 are secured to the cross head 94. A looped cable 95 secured at either end thereof to the ends of the cross head 94 carries a weighted roller 96 to maintain an equal tension on the cables 14, 15 and 16. Since the ends of the cables 14, 15 and 16 are fixed relative to each other, the counterweight system may be employed in conjunction with the apparatus illustrated in Figs. 4 and 5.

Figure 7:
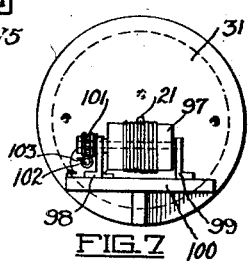
Fig. 7 is a front view of a modified form of turntable to be used in one of the elevators.
Figure 8:
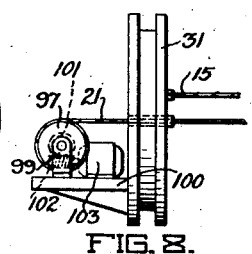
Fig. 8 is an end view of the turntable illustrated in Fig. 7.

Figs. 7 and 8 illustrate a motor and winding drum attachment for the turntable 31 for the purpose of operating the draw cable 21. A drum 97 having wrapped therearound the end of cable 21 is rotatably mounted at either end thereof on bearing brackets 98 and 99 supported on a platform 100 suitably secured to the face of the turntable 31. A worm gear 101 secured in driving relation to the shaft of the drum 97 meshes with a worm 102 provided on the shaft of an electric motor 103.

In lieu of the physical set 10, the miniature airplane 17 may be photographed before a painting of clouds, translucent screen on which a picture is projected, or the like, in correct proportion to the size of the airplane 17.

If it is desired, while employing the apparatus illustrated in Fig. 1, to tilt the airplane 17 about a transverse horizontal axis with a minimum vertical movement of the airplane as a whole, the synchronizing cable 52 may be so attached to the elevators 12 and 13 that one elevator will be raised while the other elevator is lowered and vice versa. One way in which this may be accomplished is to secure the clamp 60 of the carriage 26 to the portion of cable 52 extending between the weight 61 and the upper pulley 63 while retaining the clamp 54 of carriage 44 secured to the portion of the same cable 52 which extends between the other weight 53 and the pulley 55. The above tilting may be produced while towing the airplane 17 along the guide cables 14, 15 and 16 before the stationary miniature set 10 or it may be produced by manipulating the airplane without forward motion thereof in front of a translucent screen on which is projected a moving cinematographic background scene. In either case a motion picture camera may photograph the airplane 17 while being tilted and/or moved in front of its background.

Furthermore, in the event that it is desired to employ the method described and claimed in the aforementioned patent to Fred W. Jackman wherein the background component is photographed from a moving camera to obtain the ultimate relative movement between the miniature airplane and the background component, the miniature airplane 17 may be photographed while being banked and tilted as above described while remaining in a fixed longitudinal position. The image of the airplane 17 comprising a foreground component and the image of the background component may then be combined as described in the above patent to produce the composite picture.

I claim:

1. A system for simulating an aircraft in flight comprising the combination of a miniature aircraft, a plurality of flexible suspension members, means for slidably attaching the wings and the tail of said miniature to said members, laterally spaced means for supporting said flexible suspension members at opposite sides of said miniature, means associated with the members supporting the wings for varying the bank of said wings, means associated with said tail supporting member for varying the tilt position of said tail, and means for traversing said miniature along said suspension members.

2. A system for simulating an aircraft in flight comprising the combination of a base, a pair of spaced upright guides on said base, a carriage movable along said guides, a rotatable turntable on said carriage adapted to rotate about an axis perpendicular to the path of movement of said carriage, and means comprising a plurality of suspension members supported by said turntable for supporting a miniature aircraft.

3. A system for simulating a vehicle in travel comprising the combination of a plurality of suspension members adapted to suspend a vehicle, means on one side of said vehicle for supporting said members, and an elevator on the other side of said vehicle for supporting said members, said elevator comprising a carriage, means for guiding said carriage in a vertical path, a turntable mounted on said carriage for rotation about a horizontal axis, said turntable supporting said members, and a cam for varying the effective length of one of said suspension members as said carriage is moved.

4. A system for simulating an aircraft in flight comprising the combination of a base, a pair of spaced upright guides on said base, a carriage movable along said guides, a turntable rotatably mounted on said carriage, said turntable being adapted to support a plurality of suspension members, a cam, means for supporting said cam in fixed relation to said guides, and a cam follower carried by said turntable and engaging said cam, said cam follower being operatively connected to one of said suspension members for varying the sag therein.

5. A system for simulating a vehicle in travel comprising the combination of a pair of spaced elevators movable in substantially vertical directions, a turntable on each of said elevators, each of said turntables being rotatable about an axis substantially at right angles to the direction of travel of its elevator, a plurality of cables extending between said turntables and adapted to support a vehicle, and means for varying the effective length of one of said cables between said elevators to vary the tilt of the vehicle.

6. A system according to claim 5 comprising a counterbalance for said suspension members to compensate for a variation in the effective length of said suspension members between said turntables consequent upon movement of one of said elevators with respect to the other.

7. A system for simulating a vehicle in travel comprising the combination of a miniature of said vehicle, three cables providing a three point support for said vehicle, laterally spaced means for supporting said cables at opposite sides of said vehicle, common means at one side of said vehicle for rotating said cables about a common axis, common means at the other side of said vehicle for rotating said cables about a common axis, means for varying the effective length of one of said cables, means movably supporting each of said common means, and a cable extending between one of said common means and said vehicle for towing said vehicle along said cables.

8. A system for simulating an aircraft in flight comprising the combination of a miniature of said aircraft, a plurality of substantially parallel flexible cables forming a three point suspension for said miniature, laterally spaced means for supporting said cables on opposite sides of said miniature, means for transversely moving said cables to vary the bank of said miniature, means for varying the effective length of one of said cables to vary the tilt of said miniature, means for varying the elevation of said miniature, and means for moving said miniature along said cables.

9. A system for simulating a vehicle in travel comprising the combination of three substantially parallel suspension members adapted to provide a three point suspension for a vehicle, means on opposite sides of the vehicle for supporting said members, one of said means comprising a turntable, a carriage on which said turntable is rotatable, and an upright track on which said carriage is vertically movable.

10. A system according to claim 9 wherein a tow cable connecting said vehicle is provided for moving the said vehicle along said members.

11. A system according to claim 9 wherein each of said means comprises a carriage, turntable and track as recited in claim 9.

12. A system for simulating a vehicle in travel comprising the combination of a plurality of suspension members adapted to suspend an object to be photographed, an elevator at each side of the vehicle for supporting said members, and means for synchronizing the movement of said elevators.

13. A system according to claim 12 wherein said means comprises a pulley and cable device connecting said elevators.

14. A system for simulating an aircraft in flight comprising the combination of a track, means for suspending a miniature aircraft from said track, means for propelling said miniature on said track, and means operable during travel of said miniature on said track for tilting said track to vary the bank of the wings of said miniature.

15. A system according to claim 14 comprising means operable during travel of said miniature on said track for varying the tilt position of the tail of said miniature.

JAMES A. GIBBONS.